(12) United States Patent
Negi et al.

(10) Patent No.: US 12,052,390 B2
(45) Date of Patent: Jul. 30, 2024

(54) SELECTIVE AGGREGATION OF ENQUEUED NODES INTO A SUBNETWORK FOR SIMULTANEOUS COMMUNICATION

(71) Applicant: Avaya Management L.P., Durham, NC (US)

(72) Inventors: Manish Negi, Pune (IN); Valentine C. Matula, Granville, OH (US); Divakar Ray, Pune (IN)

(73) Assignee: Avaya Management L.P., Durham, NC (US)

( * ) Notice: Subject to any disclaimer, the term of this patent is extended or adjusted under 35 U.S.C. 154(b) by 431 days.

(21) Appl. No.: 17/185,602

(22) Filed: Feb. 25, 2021

(65) Prior Publication Data

US 2022/0272199 A1 Aug. 25, 2022

(51) Int. Cl.
*H04M 3/523* (2006.01)
*G06N 3/08* (2023.01)

(52) U.S. Cl.
CPC ............ *H04M 3/5232* (2013.01); *G06N 3/08* (2013.01); *H04M 2203/407* (2013.01)

(58) Field of Classification Search
None
See application file for complete search history.

(56) References Cited

U.S. PATENT DOCUMENTS

| | | | |
|---|---|---|---|
| 8,634,543 B2 | 1/2014 | Flockhart et al. | |
| 8,767,031 B2 | 7/2014 | Wolzien | |
| 2007/0036131 A1* | 2/2007 | Shaffer | H04M 3/523 370/352 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2013/0089007 A1* | 4/2013 | Ristock | H04M 3/42127 370/260 |
| 2020/0320590 A1* | 10/2020 | Childs | G06Q 10/06393 |
| 2021/0117213 A1* | 4/2021 | Chen | G06F 9/453 |

* cited by examiner

*Primary Examiner* — Harry S Hong
(74) *Attorney, Agent, or Firm* — Sheridan Ross P.C.

(57) ABSTRACT

Contact centers often encounter situations where a group of customers have a common issue to be addressed. Connecting each customer to an agent for one-on-one communication may be effective, but it is resource intensive both in terms of networking and computer requirements and the time an agent spends repeating the same information. By performing an initial assessment of customers' issues, a common issue may be discovered that a common issue exists that can be handled in a group lecture pod, wherein a number of customer connect to interact with an agent and optionally to each other. Provided confidential information is not required, and any other required consent given, customers may be connected to the group lecture pod for more immediate resolution of a common issue and not have to stay in queue to wait for an agent to become available for a one-on-one interaction.

20 Claims, 7 Drawing Sheets

SELECTIVE AGGREGATION OF ENQUEUED NODES INTO A SUBNETWORK FOR SIMULTANEOUS COMMUNICATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for networking and particularly to selectively connecting a number of nodes to a host node to comprise a common communication therebetween.

BACKGROUND

It is commonplace in contact centers for customers to want to engage with an agent to resolve a particular issue. When a customer initiates the communication, the contact center executes a routing flow to determine what skills are necessary to resolve the issue, what skills are presently available in the contact center, and the availability of the agents having those skills. Once a match is determined, the customer may be enqueued to wait for a particular agent or agents to become available and, once available, connected to resolve the issue one-on-one.

As the workload of the contact center ebbs and flows, during peak business hours, when agents are already engaged and may have a number of enqueued customers waiting, another new customer is parked in a waiting queue until the agent, or one of a number of similarly skilled agents, becomes available to engage with the customer. Once the customer is connected with the agent, the issue the customer wishes to resolve may be relatively rare or common, as viewed from the contact center. For example, a contact center may be providing technical support for an electronic device. A recent software update may have introduced a particular problem and now the contact center may be receiving dozens to many thousands of calls regarding the problem.

SUMMARY

Customers of a contact center may have an issue that is common to a number of other customers currently talking, or waiting to talk, to an agent one-on-one. Each customer, once connected to an agent, needs time to explain the issue in their own words, allow the agent to gather any additional information from the customer or other source, select a resolution, provide the resolution to the customer, and address any follow-up questions or issues the customer may have before the communication may be terminated and the agent connected to the next customer.

Customer may wish to discuss other topics, or irrelevant topics, or otherwise continue the communication even after the resolution has been received. As a result, agent performance can often be degraded and the wait time for subsequent customers extended further. This may be particular problematic when the contact center is currently operating under a heavy workload.

Prior art solutions include adding more agents and associated networking and computing resources, training agents to wrap-up calls as quickly as possible, warning customers that the workload and resulting wait-time may be excessive to encourage call-backs or other customer-initiated resolution, or merely enqueuing the communications and waiting whatever length of time is required. Each of the solutions of the prior art has undesirable consequences. For example, the cost to train and support additional agents and the networking and computing infrastructure required to deploy additional agents can be a serious expense or an impossibility, such as when agents with a particular skill are not available for hire. Terminating calls quickly may leave customers with a negative impression of the interaction and associated companies and/or products, as does waiting an excessive amount of time to speak with an agent. Negative customer impressions may impact a business or product's reputation and result in customer dissatisfaction, which may lead to a loss of future business.

When a contact center volume is low, compared to a current staffing level, one-on-one communications may sufficiently address the needs of the customers with no, or at least an acceptable, wait time before being connected with an agent. However, this is not always the case and the ability of a contact center to handle all calls with one-on-one communications with an agent may result in a growing queue length and require additional computing and networking resources to handle the volume of communications.

These and other needs are addressed by the various embodiments and configurations of the present invention. The present invention can provide a number of advantages depending on the particular configuration. These and other advantages will be apparent from the disclosure of the invention(s) contained herein.

By way of a general introduction, and in one embodiment, systems and methods are provided to enable a contact center to utilize a dynamic group lecture pod service as a channel to communicate and resolve issues for a plurality of customers having a common issue for which they are seeking resolution from the contact center.

The systems and methods select customers in a waiting queue that have an issue for which group resolution may be possible and, if so, the customers are moved into a group lecture pod service where a group of customers served by a single agent. Optionally, the customers may rejoin the waiting queue at their previous position if they still need one-on-one service from an agent. As a further option, customers may move from one group lecture pod service to another depending on the topic, the customer's privacy preferences, and/or suggestion from an automated agent, such as an artificially intelligent agent.

While customers, and their needs, may be evaluated to determine whether they are a fit for a particular lecture pod, an ad hoc group may be formed from customers having a similar issue. As a result, lecture pods may be created and populated on the fly.

As a further option, category topics that are discovered to be too broad, or have contradictory or unrelated sub-topics, may be split into separate lecture pods. Conversely, two separate lecture pods that are discovered, by a human or automated agent, to have sufficient overlap may be combined.

Systems and methods are also provided to ensure a topic-mandated privacy standard is met. For example, medical information may have legal requirements, such as no identifiable information is communicated to any party not needing such information in order to provide a service. In particular, a lecture pod may prohibit customers from speaking, and being heard, by anyone other than the agent. The agent then may repeat what was said but omitting any identifying information. In other embodiments, customers may have a privacy preference, such as to not have their voice presented in an audio call, to the group of customers in the lecture pod. Accordingly, they may provide text messages to the group or communicate only with the agent, who then anonymized the content for distribution to the group.

In another embodiment, customers may be asked to consent to be moved to a lecture pod. Those that do not consent remain enqueued for a one-on-one interaction with an agent, otherwise they are aggregated with other customers into the lecture pod. Customers may be provided with a brief description of what the lecture pod is, as well as the pros and cons of each. In particular, the main benefit to staying within the traditional queue will be the on-one-one attention, while the main determinant being an extended wait time. The main benefit of accepting the move to the lecture pod is more immediate assistance, but with the potential of having the interaction include irrelevant topics. Other benefits and detriments may be presented and/or realized by moving, or not moving, to the lecture pod.

Once in the lecture pod, topic and customer privacy settings and/or agent controls are utilized to determine if the customer speaks and if their voice is presented only to the agent, a subset of customer, or all customers. Customer may be "raise hand", such as by inputting a number or code to issue dual-tone multi-frequency) (DTMF) signals, wherein questions or other input from customers are taken one at a time by the agent, or the customers and agent may each be engaged in a full-duplex conversation and freely communicate with each other.

A neural network, or other AI system, may monitor an ongoing lecture pod or recording or a transcript of prior lecture pod to determine topics actually discussed, any topics that were actively discouraged, whether personal information was necessary to resolving the issue (and therefore not well suited to the lecture pod), whether customers indicated the lecture pod was successful, and/or other issues that may refine the decision-making criteria with subsequent training of the neural network.

In one embodiment, a system is disclosed, comprising: a processor configured with machine-readable instructions maintained in a non-transitory memory; an interface to a network for simultaneous communicating with nodes via the network; wherein the processor performs: obtaining issues to be addressed from each of the nodes; determining, from the issues to be addressed from each of the nodes, whether a common issue exists that is common to a subset of the nodes; evaluating whether the common issue is resolvable by a single agent simultaneously engaged with each of the plurality of the subset of the nodes; upon determining the common issue is resolvable by the single agent, establishing a subnetwork comprising each of the subset of nodes and a first agent node of the single agent for simultaneous communication thereon.

In another embodiment, a system is disclosed comprising: a processor configured with machine-readable instructions maintained in a non-transitory memory; an interface to a network for simultaneous communicating with nodes via the network; wherein the processor performs: obtaining an issue to be addressed from a new node; determining whether the issue to be addressed is sufficiently similar to a common issue to address by a subnetwork comprising a number of nodes and a first agent node; upon determining the issue to be addressed is sufficiently similar to the common issue, adding the new node to the subnetwork for simultaneous communication thereon.

In another embodiment, a method is disclosed, comprising: obtaining issues to be addressed from each of the nodes; determining, from the issues to be addressed from each of the nodes, whether the common issue exists that is common to a subset of the nodes; evaluating whether the common issue is resolvable by a single agent simultaneously engaged with each of the plurality of the subset of the nodes; upon determining the common issue is resolvable by the single agent, establishing a subnetwork comprising each of the subset of nodes and a first agent node of the single agent for simultaneous communication thereon.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
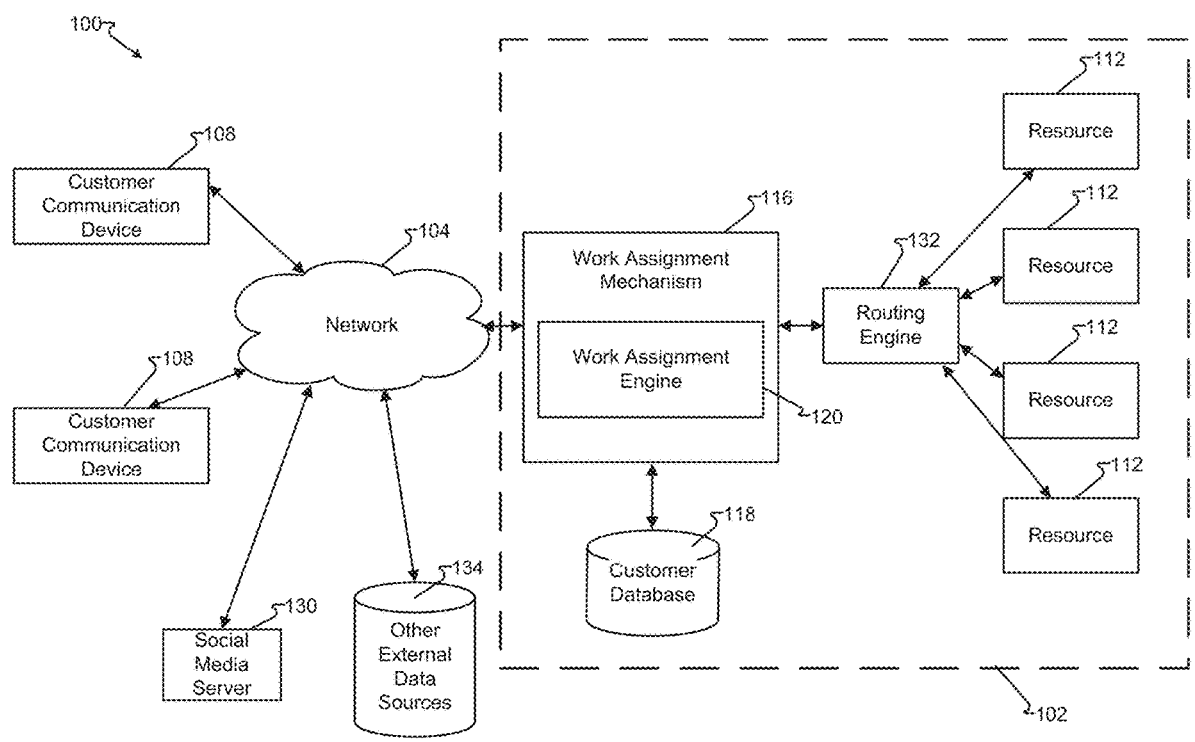
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
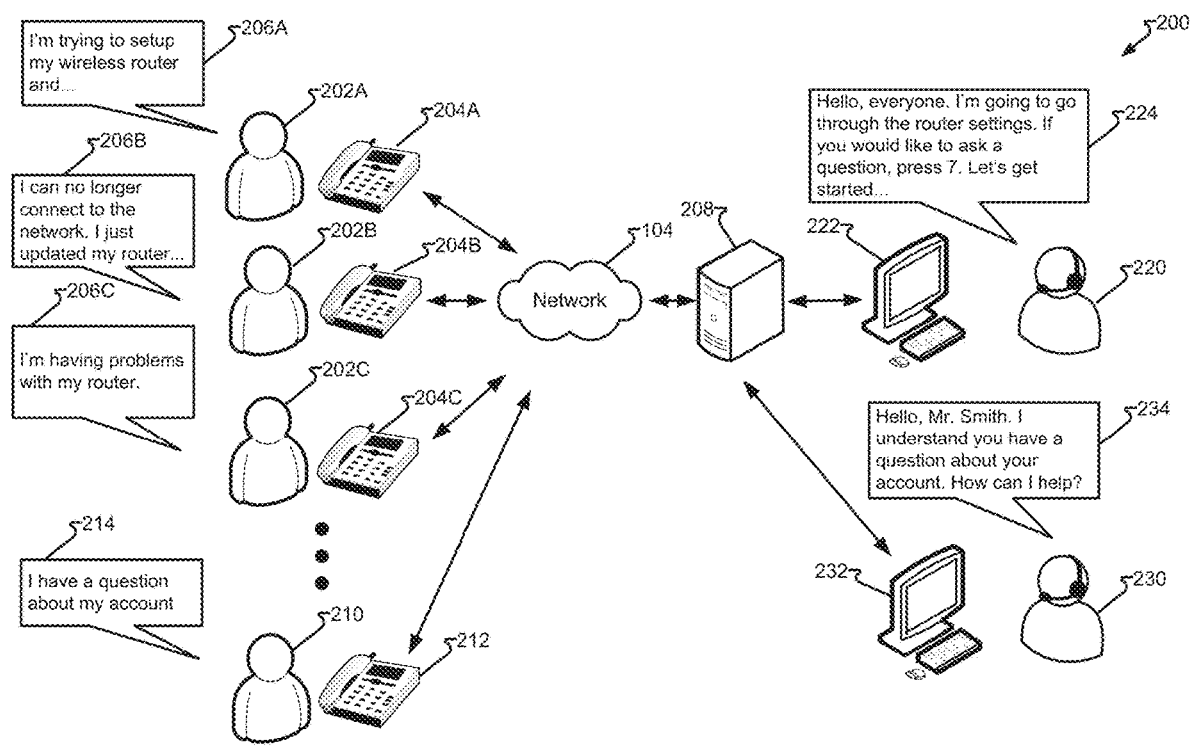
FIG. 2 depicts a second system in accordance with embodiments of the present disclosure.

FIG. 2 depicts system 200 in accordance with embodiments of the present disclosure. In one embodiment, customers or "users" of a contact center, such as contact center 102, each initiate a communication with a resource 112, when embodied as a fully interactive agent during a real-time communication, such as agent 220 or agent 230 such as to address an issue with greeting 224. Agent 220 and agent 230 are provide content and, in part, provide content responsive to questions or issues raised during the real-time interaction between any two or more nodes of the subnetwork to provide merged engagement with the users therein. Accordingly, agents referenced herein, including agent 220 and 230, are interactive and exclude the automated playback of previously recorded or generated from a transcript or other "canned" content.

User 202A utilizing user node 204A, user 202B utilizing user node 204B, user 202C utilizing user node 204C, and user 210 utilizing user node 212 each initiate communication with contact center 102 over communication network 104. Each user nodes 204 and user node 212 are embodiments of customer communication device 108 as enabled for real-time communications (e.g., voice, voice and video), but may further comprise features to enable non-real-time communications (e.g., email). Server 208 may operate, among other services, an automated embodiment of resource 112, such as an interactive voice response (IVR), decision tree, or other automated agent. Server 208 may initially assess each communication from each user (each user 202 and user 210), such as by prompting for a reason or issue that motivated the communication. In response, server 208 receives user content 206, more specifically user content 206A from user 202A, user content 206B from user 202B, user content 206C from user 202C, and user content 214 from user 210.

In one embodiment, server 208 analyzes user content 206 and user content 214 and determines if a common issue is present between a number of users 202 and user 210. For example, each of users 202 have provided user contents 206, which may be identified as being rooted in a common issue, such as the operation of a router. User content 214 may be determined by server 208 is not being directed to the common issue.

Analyzing user content 206 and/or user content 214 may determine prior to any communication with a live agent, such as during a session with an automated resource (e.g., IVR), by calling a subject-matter specific number (e.g., "call 800.000.0010 for billing issues, call 800.000.0011 for technical support," etc.). Additionally or alternatively, user content 206 and/or user content 214 may be during an established one-one-communication with an agent, such as agent 220, agent 230, or a different agent (not shown). Server 208 monitors the ongoing communication and, upon determining a common topic is present, prompt the agent and/or customer to join a lecture pod and discontinue the one-on-one communication. For example, user 202A may have been connected to a different agent and, upon the determination that a lecture pod is available to address user content 206A, server 208 automatically or in response to a prompt presented on customer user node 204A and/or agent communication node 222, discontinuation of the one-on-one communication and joins the user 202A to a lecture pod. In another embodiment, user 202A and agent 220 may be presently joined in a one-on-one communication. Server 208 determines that additional users, such as user 202B or user 202C, has the same common issue and, automatically or in response to a prompt, joined to the communication already comprising user 202A and agent 220 as a lecture pod.

Server 208 may require a certain number of users to justify the establishment and/or use of a subnetwork wherein a number of users are interconnected with an agent, such as agent 220. For example, by establishing, if not already established, a subnetwork each user therein may receive the same information provided by agent 220 and each user within the subnetwork may be removed from a traditional queue or other routing whereby a user waits for a sufficiently qualified agent to become available and, once available, connected for a one-on-one communication. A sufficiently qualified agent being an agent of a pool of agents having a skill matching a need or issue, for example, a skill to address account issues as determined from user content 214.

In one embodiment, users determined to have a common issue by server 208 are established in a subnetwork, which further comprises agent node 222 associated with agent 220. The subnetwork may comprise an audio conference, when the communication is limited to audio-only communications, or an audio-video conference when the communication on the subnetwork comprises audio and video. Accordingly, each user node 204 and agent node 222 is operable to receive and transmit encoded audio and optionally includes a camera and display to communicate encoded video. The subnetwork allows for content provided by one node (e.g., agent node 222, any one of user node 204) to be provided to one or more nodes. The content may be a full conference wherein the content provided by one node is automatically provided to all other nodes within the subnetwork. In other embodiments, agent node 222, and thereby agent 220, may provide content to all other nodes in the subnetwork but with content from other nodes only being provided to agent node 222. Additionally or alternatively, agent 220 may control communications, such that content provided by one user, for example user 202A is gated by agent node 222 and selectively received at only agent node 222 or alternatively provided to agent node 222 and each other node within the subnetwork. For example, user 202B may want to ask a question, such as by using user node 204A to signal server 208 and/or agent node 222 that user 202B has a "raised hand." As a result, agent 220 may hear the question and elect to repeat the question in order to provide the content of the question to all nodes of the subnetwork, or unmute user node 204B and allow the content provided by user 202B to be provided directly to all nodes of the subnetwork. Additionally or alternatively, one or more user node 204 may utilize a second communication channel, such as text, to type content which may be automatically provided to all members of the subnetwork, automatically provided to only agent node 222, or selectively provided to all or less than all subnetwork members.

In another embodiment, each user 202 has been added to a subnetwork based on a common issue as determined by server 208. However, user 210 has been determined, also by server 208 to have an issue not in common with the subnetwork of users 202 (and agent 220). Accordingly, user 210 is maintained in a queue or other agent-customer matching means, which may comprise a different subnetwork, and connected to agent 230 utilizing agent node 232 over communication network 104, such as to hear agent content 234 in a one-on-one interaction. As a result, the subnetwork that comprises each user node 204 and agent node 222 does not include user node 212.

Although any one or more user 202 may share the common issue, individual users 202 may opt-out and instead decline to join the subnetwork and remain queued to have a one-on-one interaction with an agent. Server 208 may have a set number of common topics and/or agents trained for the common topics to facilitate the lecture pod. For example, a recent update to a router may have introduced errors that are causing a number of users to call the contact center. Accordingly, and in another embodiment, once a previously determined number of calls regarding the common issue has been received, a subnetwork is utilized and the next set of previously determined number of calls received to be added to a second subnetwork, also to discuss the same common issues. As a result, the size of the subnetworks may be limited to be within a previously determined range. In other embodiments, the common issue may be determined dynamically, such as by analysis of a "word cloud," n-nearest neighbor, or other means to determine commonality between individual issues identified by users. In yet another embodiment, server 208 executes an artificially intelligent (AI) agent, such as a neural network to determine commonality, as described more complete with respect to certain embodiments that follow.

Users who are included within the subnetwork may decide to leave, such as by signaling server 208 via DTMF and/or other signals. A user leaving the subnetwork may be placed back into the queue to wait for a qualified agent or returned to their original position within the queue (e.g., initially placed into position thirty and, upon leaving the subnetwork, returned to position thirty), or prior position relative to other users (e.g., initially placed into position thirty, and upon leaving the subnetwork, returned to the queue into position twenty as ten prior users have been removed from the queue).

It should be appreciated that the variations in the network topology illustrated in system 200 may be modified without departing from the scope of the embodiments. In other embodiments, communication network 104 or an embodiment thereof, may interconnect any two or more components of system 200. In another embodiment, server 208 may be embodied as a single or multiple computing device, each comprising one or more microprocessors (or "processor"), which may be co-embodied with one or more other services, such as work assignment mechanism 116, work assignment engine 120, routing engine 132, and/or other data processing, data storage, and/or networking hardware.

Figure 3:
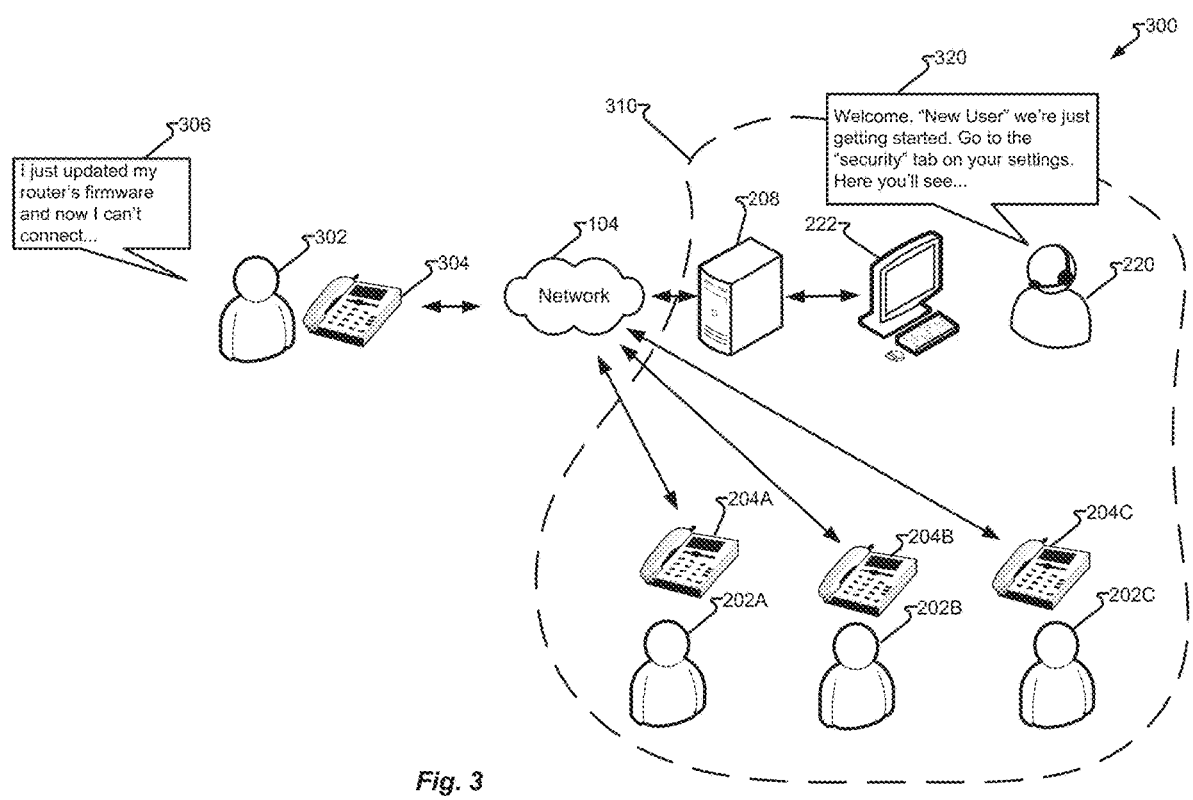
FIG. 3 depicts a third system in accordance with embodiments of the present disclosure.

FIG. 3 depicts system 300 in accordance with embodiments of the present disclosure. In one embodiment, subnetwork 310 may be established to comprise user nodes 204 utilized by corresponding users 202 and agent node 222 utilized by agent 220. After the establishment of subnetwork 310, contact center 102 may receive a subsequent call, such as from new user node 304 utilized by corresponding new user 302. Server 208 may prompt or otherwise receive new user content 306 identifying an issue that motivated the call.

Server 208 may determine that new user content 306 matches the common issue that motivated the use of subnetwork 310. Server 208 may perform other operations, such as determining whether content on subnetwork 310 has started or, if started, how long ago. As a result, subnetwork 310 that started within a previously determined period of time, such as thirty seconds or one minute, may receive additional users. The number of users added to subnetwork 310 may be limited to a particular window of time, such users having the same common issue that call within the first sixty-seconds of the establishment or initial use of subnetwork 310, and thereby avoid an excessive number of repeats of the same information provided within subnetwork 310.

New user 302 may be prompted to consent to the merged engagement with users 202 and, if declined, maintained in a traditional queue or other agent-user matching system. Once new user node 304 is added to subnetwork 310, agent 220 may provide agent content 320 and begin providing content to each node within subnetwork 310.

Figure 4:
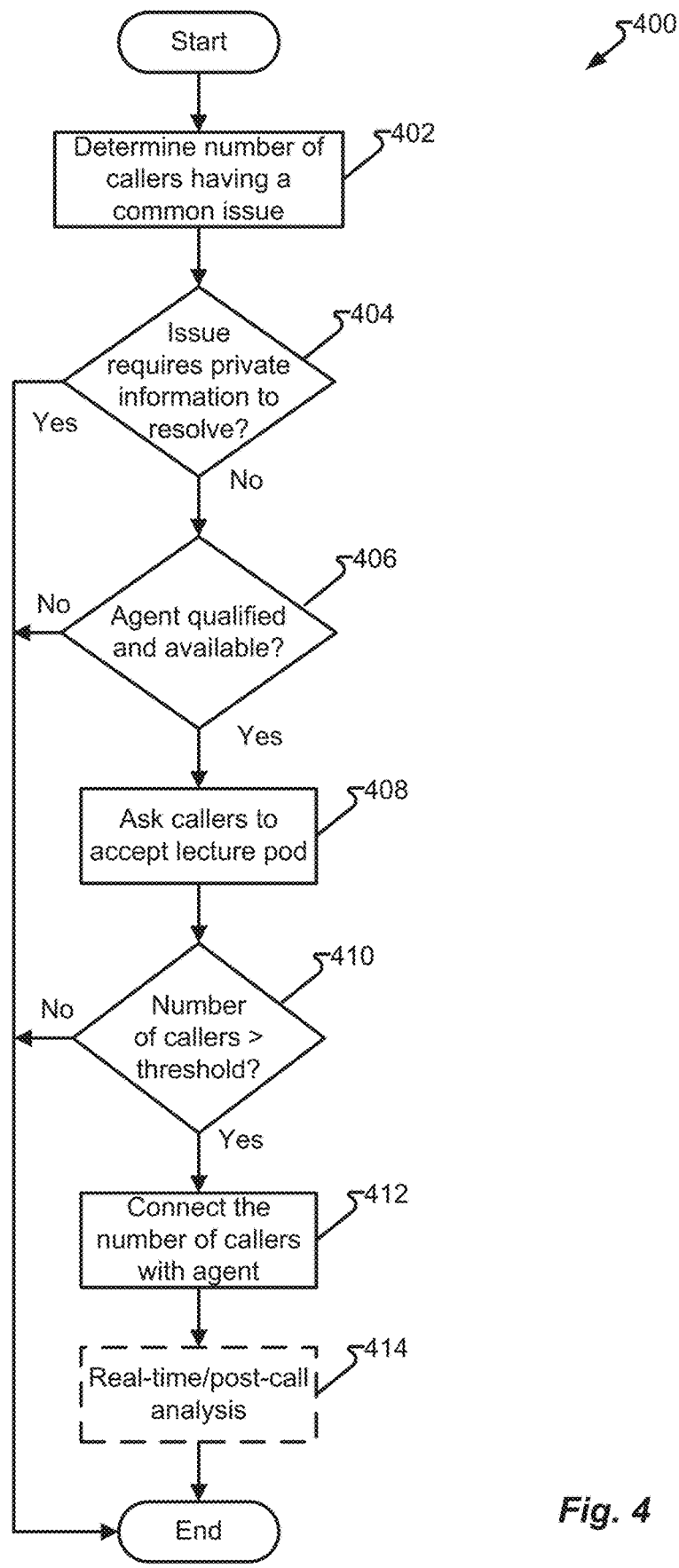
FIG. 4 depicts a first process in accordance with embodiments of the present disclosure.

FIG. 4 depicts process 400 in accordance with embodiments of the present disclosure. In one embodiment, process 400 is embodied as machine-readable instructions maintained in a non-transitory data storage that, when read by a processor, such as at least one processor of server 208 and/or other computing device, cause the at least one processor to perform the steps of process 400.

In one embodiment, process 400 determines users that may grouped into a subnetwork based on their common issue. Process 400 begins and step 402 determines a number of callers, such as users 202 have a common issue. Next, test 404 determines if the issue requires private information to be received or provided in order to be resolved. Certain information may be deemed private, sensitive, secure, or otherwise not to be shared to any party not essential to resolving the issue. For example, a user having a question about a charge on their account would need to provide the account number in order for the charge to be investigated. However, the account number is private, therefore test 404 may be determined in the negative. Similarly, private information may be necessary in order for a user to resolve the issue. For example, obtaining financial information or a new password. As a result, test 404 may be determined in the affirmative, wherein process 400 may end or restart back at step 402 for a new determination of a new common issue. If test 404 is determined in the negative, processing continues to test 406, such as to determine if a qualified agent is available to address the common issue within a lecture pod setting of a subnetwork. Test 406 may access a data storage comprising records of each agent of a pool of agents and determine if a record indicates a particular skill level for the common issue and/or ability to conduct lecture pod interactions within a subnet. If test 406 is determined in the negative, process 400 may end. If test 406 is determined in the affirmative, step 408 may then prompt the callers if they agree to the merged engagement with other users. Step 408 may present incentives to move to the subnetwork, such as, " . . . if you agree, your group session will begin within the next thirty seconds. However, if you may decline and wait for the next available agent. If you do decline, you will be connected to the next available agent for a one-on-one interaction in approximately, seventeen minutes. Press 1 to agree. Press 2 to decline."

After receiving responses from the callers, test 410 determines if the number of callers is greater than a threshold amount. While the threshold amount is not less than two, the specific value of the threshold amount may be static or dynamically determined. For example, if contact center 102 is currently at a lull in activity, the threshold amount may be relatively small. It may be assumed that the time to resolve the common issue for all users within the subnetwork is greater than or equal to the time to resolve the issue for any one user during a one-on-one interaction. Accordingly, when the workload is low, a smaller threshold number of callers may justify an agent being allocated to a lecture pod of a subnetwork. Conversely, if the workload is higher, the impact of removing an agent from a traditional queue to conduct a lecture pod may be greater and, as a result, require more callers to justify. In other embodiments, test 410 may depend on the particular common topic. For example, if resolution of the common issue requires a lot of back-and-forth between each caller and the agent, then the threshold number may be smaller. If resolution of the common issue requires limited or no information from the callers, then the threshold number may be larger. A maximum number of callers may be considered and, if over a maximum threshold, another subnetwork utilized. If test 410 is determined in the negative, such as when the number of callers cannot justify removing an agent from processing enqueued calls one-on-one, process 400 may end. If test 410 is determined in the affirmative, step 412 established, if not previously established, and each of the consenting callers connected within a subnetwork with an agent for communicating therebetween.

Step 414 may perform ongoing analysis or post-call analysis, such as by reviewing a recording or transcript of the communications comprising the lecture pod of the nodes within the subnetwork. Step 414 may determine the time required, whether callers left early, left with an indication of their issue matching the common issue, left satisfied or unsatisfied, etc. As a result of step 414, server 208 may modify operations such as to modify certain topics as to be excluded from a particular common topic, that certain common topics are or are not likely to be successfully resolved for all callers using merged engagement, etc.

Figure 5:
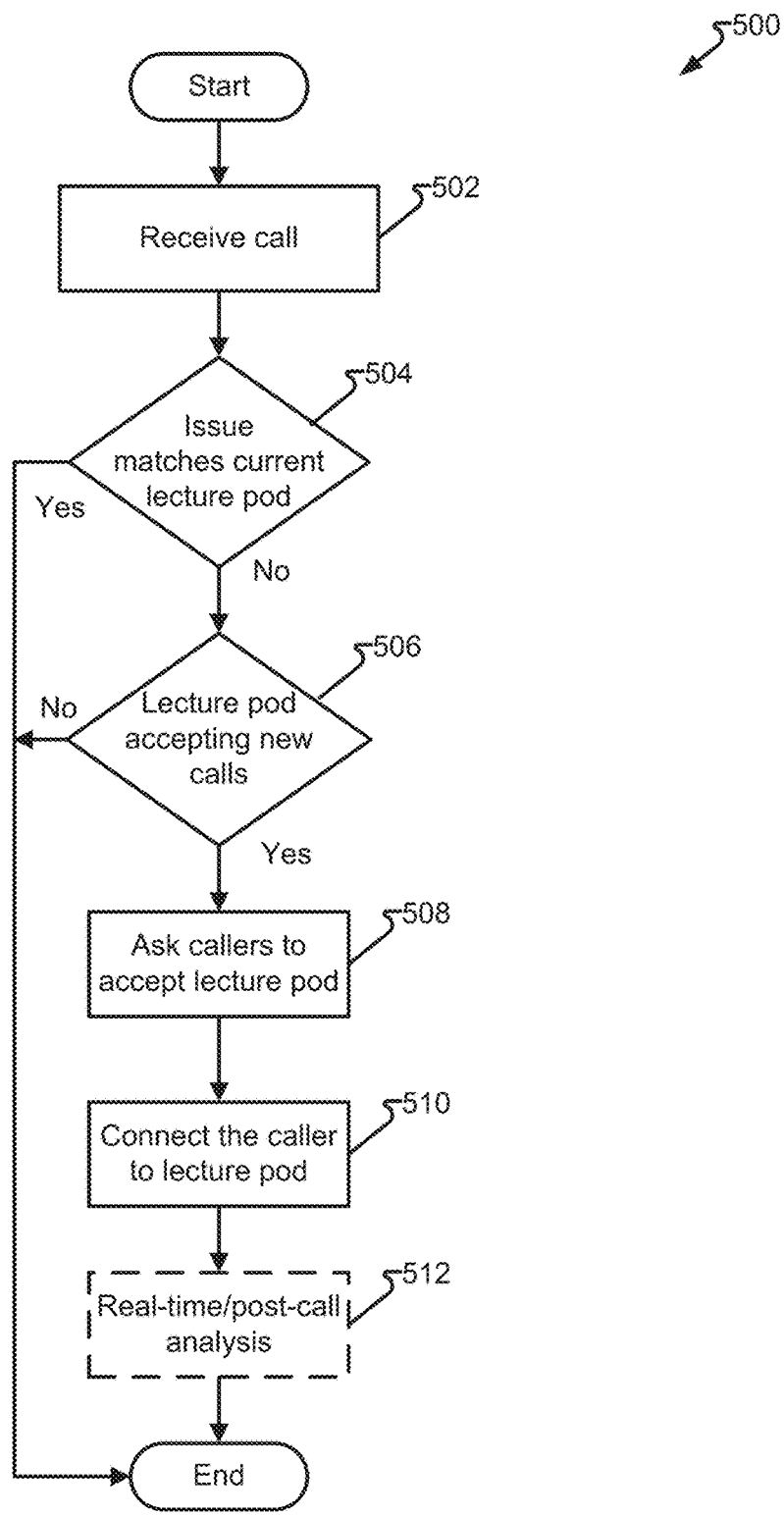
FIG. 5 depicts a second process in accordance with embodiments of the present disclosure.

FIG. 5 depicts process 500 in accordance with embodiments of the present disclosure. In one embodiment, process 500 is embodied as machine-readable instructions maintained in a non-transitory data storage that, when read by a processor, such as at least one processor of server 208 and/or other computing device, cause the at least one processor to perform the steps of process 500. In one embodiment, a call is received by contact center 102, such as by server 208 which may indicate the reason for the call is sufficiently similar to a common issue being addressed in a subnetwork, such as subnetwork 310.

Step 502 receives a call, such as from new user 302 utilizing new user node 304 to initially connect to server 208. Server 208 prompts or otherwise causes new user content 306 which, in test 504 is evaluated against a common issue discussed in a lecture pod comprising a subnetwork of interconnected nodes. If test 504 is determined in the negative, process 500 may end or loop back and restart for a next new call. If test 504 is determined in the negative, processing continues to test 506 to determine if the matching lecture pod is accepting new calls. For example, if content has been provided for a length of time beyond a threshold, then adding a new call may be more disruptive to the existing users and/or the agent. As a result, test 506 may be determined in the negative. If test 506 is determined in the affirmative, processing continues to step 508 which prompts the new caller to accept the lecture pod. And, assuming acceptance is indicated, step 510 adds the new caller node to the subnetwork and thereby connects the new caller to the lecture pod.

Optional step 512 may perform real-time or post-call analysis, such as to determine if the addition of the new caller was successful, satisfactory to the new caller, satisfactory to the existing users, etc. In response, the degree of match, determination of whether an existing lecture pod is accepting new calls, the timeframe for accepting new calls, etc., may be adjusted in response to the success, or lack of success, for any one or more users as determined in step 512.

Figure 6:
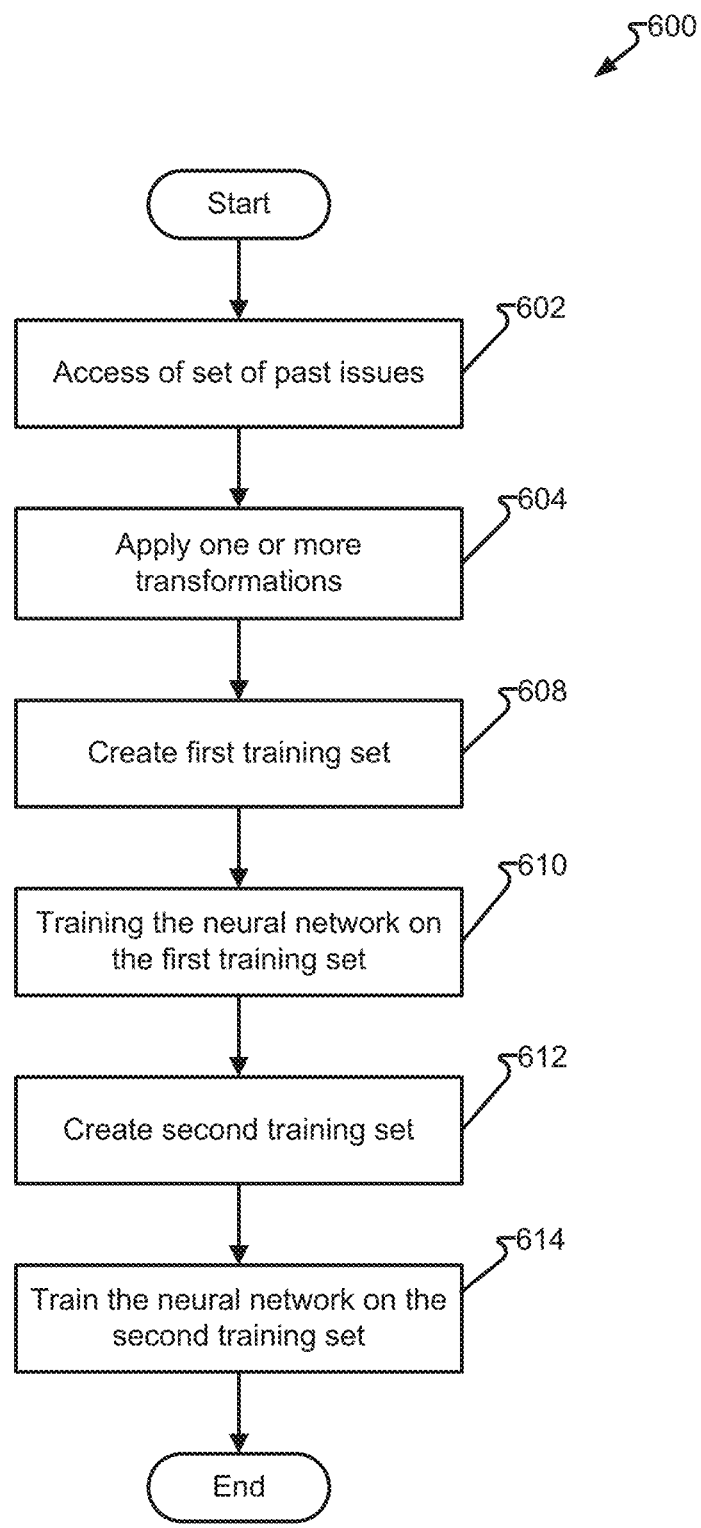
FIG. 6 depicts a third process in accordance with embodiments of the present disclosure.

FIG. 6 depicts process 600 in accordance with embodiments of the present disclosure. In one embodiment, process 600 is embodied as machine-readable instructions maintained in a non-transitory data storage that, when read by a processor, such as at least one processor of server 208 and/or other computing device, cause the at least one processor to perform the steps of process 600.

Process 600 illustrates the training of a neural network, such as to enable server 208 to make a determination as to whether or not two or more issues represent a common issue that may be addressed by addressing the common issue. A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In step 602, a set of past issues is accessed. The past issues as they may be raised by the user of contact center 102, such as when the user calls seeing to have an issue addressed by an agent of contact center 102. Past issues may be presented by uses with varying degrees of articulation and/or accuracy (e.g., "It's not working," versus "I'm getting error code 1234." etc.). Step 604 applies one or more transformations to the set of past issues. The transformations include one or more one or more of substituting a word with a synonymous word, substituting a word with a synonymous phrase, substituting a problem for an object associated with the problem, substituting the object for the problem associated with the object, issue, inserting at least one redundant word, removing at least one redundant word, insertion of extraneous information, and/or removal of extraneous information.

Next, step 608 creates a first training set to comprise the past issues, the modified set of past issues, and a unique issues that are not common issues. Step 610 then trains the neural network on the first set of training data. A second set of training data is created in step 612, comprising the first set of training data and the unique issues that are incorrectly identified as being common issues after training the neural network with the first training set. Then, in step 614, the neural network is trained with the second training set.

In another embodiment, the neural network, once trained, is provided by a server, such as server 208, determining whether an issue associated with a particular use is a common issue and receiving from the neural network, an indication of whether the issue is or is not an instance of the common issue. Should server 208 receive a determination that is found to be in error, such as to mistakenly conclude that a user was added to a subnetwork to conduct a lecture pod to address a particular common issue, that the user left prematurely or was otherwise determined to have an issue that is not an instance of the common issue, the neural network may be provided with indicia of the error to further correct and improve the accuracy of the decisions made by server 208 and the neural network.

Figure 7:
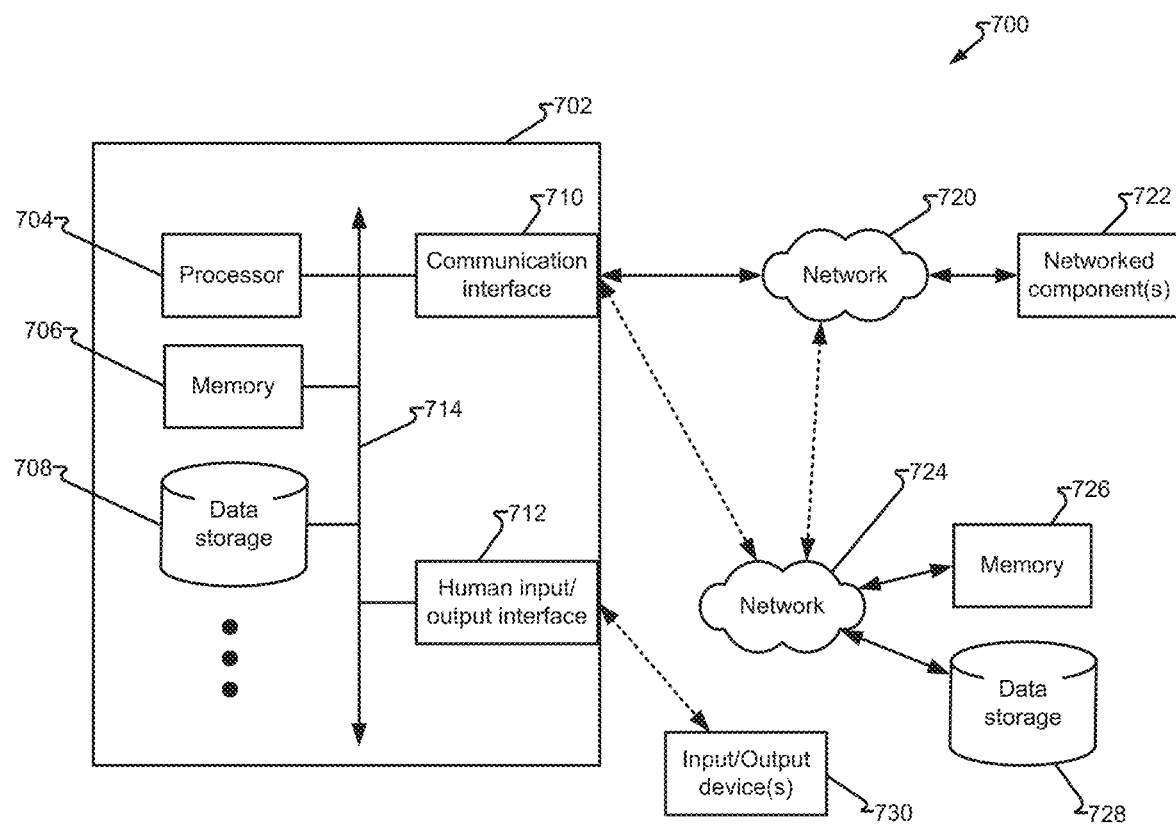
FIG. 7 depicts a fourth system in accordance with embodiments of the present disclosure.

FIG. 7 depicts device 702 in system 700 in accordance with embodiments of the present disclosure. In one embodiment, server 208 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, communication interface 710 may comprise, or be comprised by, human input/output interface 712. Communication interface 710 may be configured to communicate directly with a networked component or utilize one or more networks, such as network 720 and/or network 724.

Communication network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with networked component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a processor configured with machine-readable instructions maintained in a non-transitory memory; and
    an interface to a network for simultaneous communication with nodes via the network;
    wherein the processor performs:
        obtaining issues to be addressed from each of the nodes;
        determining, from the issues to be addressed from each of the nodes, whether a common issue exists that is common to a subset of the nodes;
        evaluating whether the common issue is resolvable by a single agent simultaneously engaged with each of a plurality of the subset of the nodes;
        upon determining the common issue is resolvable by the single agent, establishing a subnetwork comprising each of the plurality of the subset of nodes and a first agent node of the single agent for simultaneous communication thereon;

determining an excluded node of the nodes exists, wherein the excluded node was not added to the subnetwork; and enqueuing the excluded node for connection with a second agent node of a second agent for one-on-one communication therebetween.

2. The system of claim 1, wherein the processor performs determining whether the common issue exists that is common to the subset of the nodes, further comprising the processor determining:

a first estimated handling time to address each issue for the plurality of the subset of nodes utilizing one-on-one communication with one of a pool of agents, each utilizing a corresponding one of a pool of agent nodes; and a second estimated handling time to address each issue for the plurality of the subset of nodes utilizing the subnetwork, and wherein the common issue exists upon determining the second estimated handling time is less than the first estimated handling time.

3. The system of claim 2, wherein the first estimated handling time further comprises a time enqueued by each of the nodes before the one-on-one communication is established.

4. The system of claim 1, wherein the processor performs the determining of whether common issues exist comprising:

prompting a user associated with each of the nodes to describe an issue;

receiving from each of the nodes a description of the issue; and providing each description of the issue as a first input to a neural network trained to determine common issues and receiving a decision therefrom.

5. The system of claim 4, wherein the neural network is trained to determine common issues, comprising:

accessing a set of past issues;

applying one or more transformations to each past issue of the set of past issues including one or more of substituting a word with a synonymous word, substituting a word with a synonymous phrase, substituting a problem for an object associated with the problem, substituting the object for the problem associated with the object, inserting at least one redundant word, or removing at least one redundant word to create a modified set of past issues;

creating a first training set comprising the set of past issues, the modified set of past issues, and a set of unique issues;

training the neural network in a first state using the first training set;

creating a second training set for a second state of training comprising the first training set and the set of unique issues that are incorrectly identified as being common issues; and training the neural network in the second state of training using the second training set.

6. The system of claim 1, wherein the processor determines, from the issues to be addressed from each of the nodes, whether the common issue exists that is common to the subset of the nodes, further comprising determining whether the common issue exists that does not require knowledge of information previously determined to be private in order to select a resolution to address the common issue.

7. The system of claim 1, wherein the processor determines, from the issues to be addressed from each of the nodes, whether the common issue exists that is common to the subset of the nodes, further comprising determining whether the common issue exists that does not require providing information previously determined to be private in order to carry out a resolution to address the common issue.

8. The system of claim 1, further comprising the processor:

accessing a queue comprising an ordered number of entries, each entry comprising an indicia of a corresponding node of the nodes and wherein a qualified agent becomes available accessing the entry in a first position within the ordered number of entries is accessed and the corresponding node evaluated for connection to an agent node of the qualified agent;

wherein the evaluation comprises determining whether the corresponding node is a member of the subnetwork;

upon determining the corresponding node is not a member of the subnetwork, the evaluation is determined in the affirmative and the corresponding node connected to the agent node, the entry in the first position is removed from the queue, and each remaining entry is moved up in the queue;

upon determining the corresponding node is a member of the subnetwork, the evaluation is determined as a user response to a prompt to the corresponding node offering to disconnect from the subnetwork and connect to the qualified agent for a one-on-one interaction; and upon the user response being in the affirmative, disconnecting the corresponding node from the subnetwork and connecting to the qualified agent.

9. The system of claim 8, wherein the processor, upon the user response being in the negative, maintains the corresponding node in the subnetwork and moves the entry in the first position within the ordered number of entries to a second position within the ordered number of entries.

10. A method, comprising:

accessing nodes;

obtaining issues to be addressed from each of the nodes;

determining, from the issues to be addressed from each of the nodes, whether a common issue exists that is common to a subset of the nodes;

evaluating whether the common issue is resolvable by a single agent simultaneously engaged with each of a plurality of the subset of the nodes;

upon determining the common issue is resolvable by the single agent, establishing a subnetwork comprising each of the plurality of the subset of nodes and a first agent node of the single agent for simultaneous communication thereon;

determining an excluded node of the nodes exists, wherein the excluded node was not added to the subnetwork; and enqueuing the excluded node for connection with a second agent node of a second agent for one-on-one communication therebetween.

11. The method of claim 10, further comprising:

obtaining an issue to be addressed from a new node;

determining whether the issue to be addressed is sufficiently similar to the common issue; and upon determining the issue to be addressed is sufficiently similar to the common issue, adding the new node to the subnetwork for simultaneous communication thereon.

12. The method of claim 10, wherein determining whether the common issue exists that is common to the subset of the nodes, further comprises a processor determining:
a first estimated handling time to address each issue for the plurality of the subset of nodes utilizing one-on-one communication with one of a pool of agents, each utilizing a corresponding one of a pool of agent nodes; and
a second estimated handling time to address each issue for the plurality of the subset of nodes utilizing the subnetwork, and
wherein the common issue exists upon determining the second estimated handling time is less than the first estimated handling time.

13. The method of claim 10, wherein determining, from the issues to be addressed from each of the nodes, whether the common issue exists that is common to the subset of the nodes, further comprising determining whether the common issue exists that does not require knowledge of information previously determined to be private in order to perform at least one of selecting of a resolution to address the common issue or to carry out the resolution to address the common issue.

14. A method, comprising:
accessing nodes;
obtaining issues to be addressed from each of the nodes;
determining, from the issues to be addressed from each of the nodes, whether a common issue exists that is common to a subset of the nodes;
evaluating whether the common issue is resolvable by a single agent simultaneously engaged with each of a plurality of the subset of the nodes; and
upon determining the common issue is resolvable by the single agent, establishing a subnetwork comprising each of the plurality of the subset of nodes and a first agent node of the single agent for simultaneous communication thereon; and
wherein determining whether the common issue exists that is common to the subset of the nodes, further comprises a processor determining:
a first estimated handling time to address each issue for the plurality of the subset of nodes utilizing a one-on-one communication with one of a pool of agents, each utilizing a corresponding one of a pool of agent nodes; and
a second estimated handling time to address each issue for the plurality of the subset of nodes utilizing the subnetwork; and
wherein the common issue exists upon determining the second estimated handling time is less than the first estimated handling time.

15. The method of claim 14, wherein determining, from the issues to be addressed from each of the nodes, whether the common issue exists that is common to the subset of the nodes, further comprising determining whether the common issue exists that does not require knowledge of information previously determined to be private in order to perform at least one of selecting of a resolution to address the common issue or to carry out the resolution to address the common issue.

16. The method of claim 14, further comprising:
obtaining an issue to be addressed from a new node;
determining whether the issue to be addressed is sufficiently similar to the common issue; and
upon determining the issue to be addressed is sufficiently similar to the common issue, adding the new node to the subnetwork for simultaneous communication thereon.

17. The method of claim 14, wherein the first estimated handling time further comprises a time enqueued by each of the nodes before the one-on-one communication is established.

18. The method of claim 14, wherein determining whether the common issue exist comprises:
prompting a user associated with each of the nodes to describe the common issue;
receiving from each of the nodes a description of the common issue; and
providing each description of the common issue as a first input to a neural network trained to determine common issues and receiving a decision therefrom.

19. The method of claim 18, wherein the neural network is trained to determine common issues, comprising:
accessing a set of past issues;
applying one or more transformations to each past issue of the set of past issues including one or more of substituting a word with a synonymous word, substituting a word with a synonymous phrase, substituting a problem for an object associated with the problem, substituting the object for the problem associated with the object, inserting at least one redundant word, or removing at least one redundant word to create a modified set of past issues;
creating a first training set comprising the set of past issues, the modified set of past issues, and a set of unique issues;
training the neural network in a first state using the first training set;
creating a second training set for a second state of training comprising the first training set and the set of unique issues that are incorrectly identified as being common issues; and
training the neural network in the second state of training using the second training set.

20. The method of claim 14, wherein the processor determines, from the issues to be addressed from each of the nodes, whether the common issue exists that is common to the subset of the nodes, further comprising determining whether the common issue exists that does not require knowledge of information previously determined to be private in order to select a resolution to address the common issue.

* * * * *